United States Patent [19]
Anand et al.

[11] Patent Number: 6,141,705
[45] Date of Patent: Oct. 31, 2000

[54] SYSTEM FOR QUERYING A PERIPHERAL DEVICE TO DETERMINE ITS PROCESSING CAPABILITIES AND THEN OFFLOADING SPECIFIC PROCESSING TASKS FROM A HOST TO THE PERIPHERAL DEVICE WHEN NEEDED

[75] Inventors: Sanjay Anand, Redmond, Wash.; Kyle Brandon, Madison, Wis.; Nk Srinavas, Issaquah; Jameel Hyder, Redmond, both of Wash.

[73] Assignee: Microsoft Corporation, Redmond, Wash.

[21] Appl. No.: 09/097,169

[22] Filed: Jun. 12, 1998

[51] Int. Cl.[7] ........................................... G06F 13/14
[52] U.S. Cl. ..................... 710/15; 709/203; 709/219; 709/223; 711/39; 714/104
[58] Field of Search ................... 709/203, 219, 709/223; 711/39; 714/104; 710/15

[56] References Cited

U.S. PATENT DOCUMENTS

| | | | |
|---|---|---|---|
| 5,410,696 | 4/1995 | Seki et al. | 395/706 |
| 5,504,903 | 4/1996 | Chen et al. | 713/1 |
| 5,621,894 | 4/1997 | Menezes et al. | 709/227 |
| 5,634,070 | 5/1997 | Robinson | 395/800 |
| 5,678,021 | 10/1997 | Pawate et al. | 711/104 |
| 5,717,691 | 2/1998 | Dighe et al. | 370/401 |
| 5,737,520 | 4/1998 | Gronlund et al. | 714/39 |
| 5,889,848 | 3/1999 | Cookson | 379/230 |
| 5,913,028 | 6/1999 | Wang et al. | 709/203 |

FOREIGN PATENT DOCUMENTS 0778523  6/1997   European Pat. Off. .

OTHER PUBLICATIONS

Gott, Robert A., "Intelligent I/O Eases Subsystem Development," *Computer Design*, vol. 37, No. 5, pp. 106, 108–110, May 1, 1998.

*Primary Examiner*—Thomas C. Lee
*Assistant Examiner*—Abdelmoniem Elamin
*Attorney, Agent, or Firm*—Workman, Nydegger, Seeley

[57] ABSTRACT

The present invention is directed to a method and computer program product for offloading specific processing tasks that would otherwise be performed in a computer system's processor and memory, to a peripheral device, or devices, that are connected to the computer. The computing task is then performed by the peripheral, thereby saving computer system resources for other computing tasks and increasing the overall computing efficiency of the computer system. In one preferred embodiment, the disclosed method is utilized in a layered network model, wherein computing tasks that are typically performed in network applications are instead offloaded to the network interface card (NIC) peripheral. An application executing on the computer system first queries the processing, or task offload capabilities of the NIC, and then selectively enables those capabilities that may be subsequently needed by the application. The specific processing capabilities of a NIC are made available by creating a task offload buffer data structure, which contains data indicative of the processing capabilities of the corresponding NIC. Once an application has discerned the capabilities of a particular NIC, it will selectively utilize any of the enabled task offload capabilities of the NIC by appending packet extension data to the network data packet that is forwarded to the NIC. The device driver of the NIC will review the data contained in the packet extension, and then cause the NIC to perform the specified operating task(s). This offloading of computing tasks on a per-packet basis allows an application to selectively offload tasks on a dynamic, as-needed basis. As such, applications executing on the computer system processor are able to offload tasks in instances where it is busy processing other computing tasks and processor overhead is high. Multiple tasks can also be offloaded in batches to a particular peripheral.

28 Claims, 5 Drawing Sheets

SYSTEM FOR QUERYING A PERIPHERAL DEVICE TO DETERMINE ITS PROCESSING CAPABILITIES AND THEN OFFLOADING SPECIFIC PROCESSING TASKS FROM A HOST TO THE PERIPHERAL DEVICE WHEN NEEDED

BACKGROUND OF THE INVENTION

1. The Field of the Invention

The present invention relates general y to methods for increasing the efficiency, speed and/or throughput of a computer system. More specifically, the invention relates to methods for offloading computing tasks that are typically performed by a host processor in software, to a specific hardware component, thereby freeing up host processor resources and increasing the overall efficiency of the computer system.

2. The Prior State of the Art

A functional computer system generally consists of three fundamental components. The first component is the host computer and its associated peripheral hardware components. The host computer typically includes a central processing unit (CPU), which is interconnected via a bus with, for instance, system memory such as RAM or ROM. A system will also include a number of peripheral hardware devices, depending on the functionality needed, such as magnetic or optical disk storage devices, a keyboard or other input device, a display or other output device and communication equipment, such as a modem and/or a network interface card (NIC). Another fundamental computer component is the application software. Such software includes the familiar word processing applications, spread sheet applications, database applications, communications and network applications and so forth.

The final component of a modern, functional computer system is an operating system. The computer operating system performs many functions such as allowing a user to initiate execution of an application program. In addition, modern operating systems also provide an interface between application software and the host computer and its peripheral hardware. Thus, while it was once commonplace for an application program to directly access computer system hardware, modern operating systems provide standardized, consistent interfaces that allow user applications to interface with or access computer hardware peripherals in a standardized manner. To provide a consistent interface, operating system architectures are increasingly designed so that there may be several software layers between the actual hardware peripheral and the application program. For example, an application may make a call into the operating system. The operating system, in turn, may utilize the services provided by a hardware device driver layer. The device driver layer would then interface directly with the specific hardware peripheral. A primary advantage of such a layered approach is that layers may be added or replaced without impacting the other layers.

As will be appreciated, the complexity and sophistication of such operating systems, application software, and networking and communications continues to increase. This of course results in more functional and useful computer systems. However, this increased functionality is not without a cost. More feature rich operating systems and software applications often result in an increase in the processor overhead as a result of the additional duties that must be performed by a processor/CPU when executing such system functions and/or applications. This phenomenon is especially apparent in connection with particular types of applications, such as network communication-type software applications. With the high bandwidth media that is increasingly prevalent, network speeds often match or exceed the CPU processor speed and memory bandwidth of the host computer. As such, to efficiently communicate over such networks, the CPU utilization and memory bandwidth user of the network-connected host computer must be minimized.

In addition, network applications further burden the host processor due to the layered architecture used by most, such as the seven-layer ISO model, or the layered model used by the Windows NT operating system. As is well known, such a model is used to describe the flow of data between the physical connection to the network and the end-user application. The most basic functions, such as putting data bits onto the network cable, are performed at the bottom layers, while functions attending to the details of applications are at the top layers. Essentially, the purpose of each layer is to provide services to the next higher layer, shielding the higher layer from the details of how services are actually implemented. The layers are abstracted in such a way that each layer believe it is communicating with the same layer on the other computer that is being communicated with via the network.

As will be appreciated, the various functions that are performed on a data packet as it proceeds between layers can be software intensive, and thus can demand a substantial amount of CPU processor and memory resources. For instance, in the Windows NT networking model, certain functions that are performed on the packet at various layers are extremely CPU intensive, such as packet checksum calculation and verification; encryption and decryption of data; message digest calculation and TCP segmentation. As each of these functions are performed, the resulting demand on the CPU/memory can greatly effect the throughput and performance of the overall computer system.

Although software applications and operating system functions are placing greater demands on computer system resources, at the same time the capability, efficiency, and throughput of many computer hardware peripherals—such as network interface cards (NICs)—is also increasing. These computer system peripherals are often equipped with a dedicated processor and memory, and typically are capable of performing very sophisticated and complex computing tasks—tasks that are otherwise performed by the computer system processor in software. For instance, many NICs are capable of independently performing tasks otherwise performed by the CPU in software at an appropriate network layer, such as checksum calculation/verification; data encryption/decryption; message digest calculation; TCP segmentation; and others. As such, there is an advantage in offloading such CPU intensive task to a peripheral hardware device. This would reduce processor utilization and memory bandwidth usage in the host computer, and thereby increase the efficiency, speed and throughput of the overall system.

However, the processing capabilities of different peripheral devices vary widely. Thus, there needs to be an efficient method by which a computer system/operating system can identify the processing capabilities of such peripheral devices, and then assign and offload specific processing tasks to the device when needed. Also, it would be desirable if the tasks could be identified and assigned dynamically, depending on the then current needs of the processor. This would allow the computer system processor to take advantage of the capabilities of a hardware peripheral on an as-needed basis.

SUMMARY AND OBJECTS OF THE INVENTION

The foregoing problems in the prior state of the art have been successfully overcome by the present invention, which is directed to a system and method for offloading functions and tasks that were previously performed at a processor-software level, to an appropriate hardware peripheral connected to the computer system. The invention is particularly useful in connection with the offloading of tasks to network interface card (NIC) peripheral devices, which can often perform many of the tasks otherwise performed by the computer CPU in software.

In a preferred embodiment of the invention, a software implemented method and protocol is provided that allows, for instance, the operating system (OS) to "query" the device drivers (often referred to as "MAC" drivers) of any hardware peripherals (such as a NIC) that are connected to the computer system. The various device drivers each respond by identifying their respective hardware peripheral's processing capabilities, referred to herein as "task offload capabilities." In the preferred embodiment, once the task offload capabilities of each particular peripheral have been identified, the OS can then enable selected peripherals to perform certain tasks that could potentially be used by the OS. The OS can thereafter request that a peripheral perform the previously enabled task, or tasks, in a dynamic, as-needed basis, depending on the then current processing needs of the computer system.

While this general inventive concept would be applicable to other application or operating system environments, embodiments of the current invention are described herein as being implemented and utilized in connection with the layered networking model of Windows NT. Of course, the invention could be implemented in connection with essentially any similar type of architecture for managing and controlling network communications. Specifically, the invention provides the ability to offload tasks or functions that are typically performed on a network packet at, for instance, the various network layers, and which typically require dedicated CPU and memory resources. These offloaded tasks can instead be optionally performed by the hardware peripheral that provides the actual physical communications channel to the network—the NIC. For instance, rather than perform certain of the CPU intensive operations on the data packet as it passes through the respective network layers—e.g. checksum calculation/verification, encryption/decryption, message digest calculation and TCP segmentation—those tasks can instead be offloaded and performed at the NIC hardware.

In a preferred embodiment of the present invention, in the Windows NT layered networking architecture, a transport protocol driver, or transport, is implemented with an appropriate program method so as to be capable of querying each of the device driver(s) associated with the corresponding NIC(s) connected to the computer. Each queried device driver is similarly implemented so as to be capable of responding by identifying its specific processing, or "task offload" capabilities. In a preferred embodiment, once the task offload capabilities of each individual peripheral device have been identified, the transport sets which of those specific capabilities are to be enabled. This essentially informs the peripheral device what type of tasks it should expect to perform during subsequent transmissions and/or receptions of data packets. Thereafter, the transport is able to take advantage of the enabled capabilities of a peripheral device on an as-needed basis. Preferably, the enabled functions are invoked via appropriate data that is appended to the actual data packet destined for the network channel. In this way, tasks can be offloaded dynamically, and more than one task can be offloaded at a time.

Thus, before a network packet is to be sent to a particular lower level device driver (e.g., residing at the MAC sublayer in a Windows NT environment), the transport will first determine what the capabilities of the corresponding NIC are. If capable of a particular function or functions, the transport enables the desired functions. If during subsequent packet transmissions the transport desires that a particular task be offloaded to hardware, it can dynamically append information to the packet that signifies that the desired function(s) should be performed on that packet at the NIC hardware. For instance, the transport will set a data flag in the data packet, thereby notifying the corresponding device driver that the NIC should calculate and append a checksum to that outgoing packet. The hardware/software on the corresponding NIC will then handle this particular packet processing on its own, without any intervention or assistance from the system CPU. The system processor is thus freed up to perform other processing tasks, and the overall efficiency and throughput of the system is improved.

As noted, in a preferred embodiment, asks are downloaded dynamically. That is, the capability of the NIC can be selectively use on a per-packet basis, depending on the then current needs of the computer system. Moreover, since tasks that were previously performed at various levels of the network stack are now performed at a single point—the NIC itself—the approach is more tightly integrated and efficient, further improving the throughput of the entire system. Preferably, embodiments of the current invention provide the transport with the ability to "batch" operations, i.e., offload multiple tasks to a single NIC. For instance, a single NIC can perform both checksumming and encryption on a packet, thereby eliminating multiple cpu cycles that would have otherwise been needed if the same functions were implemented at the respective network layers in software.

Accordingly, it is a primary object of this invention to provide a system and method for offloading computing tasks from a computer system processor to a hardware peripheral connected to the computer system. It is another object of this invention to provide a system and method for identifying the processing capabilities of individual peripherals. It is still another object of the present invention to provide a system and method for offloading tasks that can be effectively used in connection with a layered network architecture, whereby tasks that are typically performed at various layers in the network are instead offloaded to the appropriate network interface card (NIC). A related object of the invention is to provide a system and method in which computing tasks can be offloaded in a dynamic, as-needed basis, depending on the then current processing state of the computer processor. Yet another object of the present invention is to provide a system and method in which multiple tasks can be batched together, and then offloaded to a single peripheral device, such as a NIC.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specify embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

Figure 1:
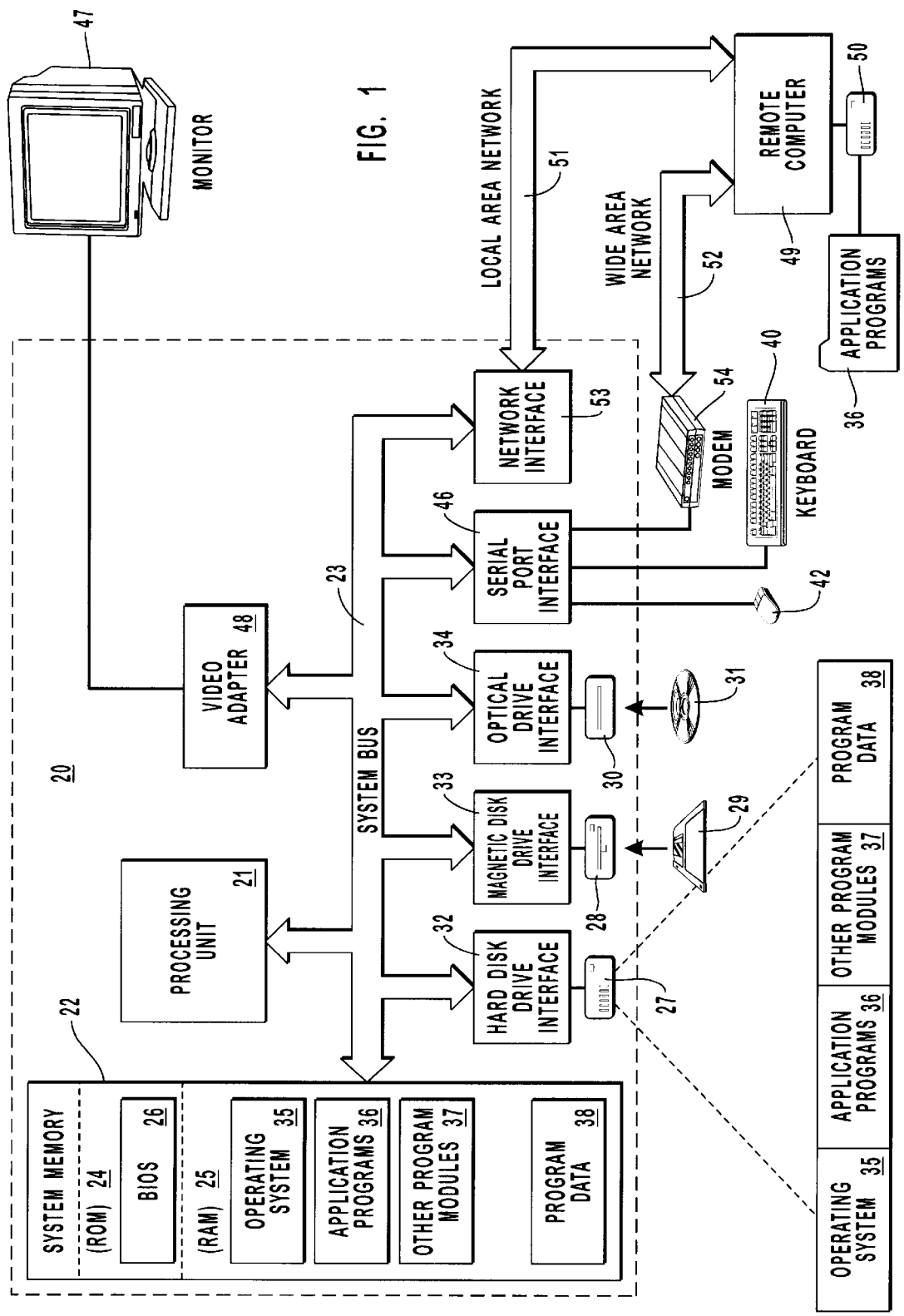
FIG. 1 is a diagram representing an example of a typical computer system and attached peripheral devices that can be used in connection with the present invention.

The invention is described below by using diagrams to illustrate either the structure or processing of embodiments used to implement the system and method of the present invention. Using the diagrams in this manner to present the invention should not be construed as limiting of its scope. The present invention contemplates both methods and systems for offloading processing tasks from a host computer, such as a personal computer to computer connected hardware peripherals, such as a network interface card (NIC). FIG. 1 and the following discussion are intended o provide a brief, general description of a suitable computing environment in which the invention may be implemented. Although not required, embodiments of the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including, hand-held devices, multiprocessor systems, microprocessor-based or programmable consumer electronics, network PCs, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21 (sometimes referred to as the CPU), a system memory 22, and a system bus 23 that couples various system components including the system memory to the processing unit 21. The system bus 23 may be any of several types of bus structures including a memory bus or memory controller, a peripheral bus, and a local bus using any of a variety of bus architecture. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a variety of peripheral hardware devices, such as hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a peripheral hardware device such as a serial port interface 46 that is coupled to the system bus, but may be connected by other interfaces, such as a parallel port, game port or a universal serial bus (USB). A monitor 47 or other type of display device is also connected to the system bus 23 via a peripheral hardware interface device, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide a ea network (WAN) 52. Such networking environments are commonplace in offices enterprise-wide computer networks, intranets and the Internet.

When used in a LAN networking environment, the personal computer 20 is connected to the local network 51 through a peripheral hardware device often referred to as a network interface card (NIC) or adapter 53. When used in a WAN networking environment, the personal computer 20 typically includes a modem 54 or other means for establishing communications over the wide area network 52, such as the Internet. The modem 54, which may be internal or external, and typically is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also included within the scope of computer readable media. Executable instructions comprise, for example, instructions and data which cause a general purpose computer, special purpose computer, or special purpose processing device to perform a certain function or group of functions. Finally, embodiments within the scope of the present invention comprise a computer readable medium having a plurality of data fields stored thereon that represent a data structure.

Embodiments of the present invention are directed to providing the ability to reducing the processing overhead and memory usage of a processing unit 21. This is accomplished by offloading particular computing tasks, which are accomplished for instance by way of an operating system, application programs and/or other program modules that are executing on the processing unit/CPU 21, to an appropriate peripheral hardware device connected to the computer system 20. Many such peripheral devices are increasingly equipped with dedicated processors and memory, and are fully capable of performing many of the same tasks that are typically accomplished solely by the CPU 21. Examples of such devices could include, for instance, network interface cards (53 in FIG. 1); disk drive interface cards (e.g., 32, 33, 34 in FIG. 1); small computer system interface (SCSI) devices; intelligent serial interface cards; or application specific peripherals, such as devices for the encryption/decryption of data.

While the general inventive concepts discussed herein could be used to offload computing tasks in connection with any of the above peripheral hardware devices, the invention will be described with respect to an example of one presently preferred embodiment, wherein computing tasks are offloaded to a network communications device, such as NIC 53 illustrated in FIG. 1. More particularly, illustrative embodiments are discussed as being implemented in the networking environment and architecture of the Windows NT operating system available from Microsoft Corporation. However, it will be appreciated that while specific reference is made to Windows NT concepts and terminology, those skilled in the art will recognize that many, if not most, operating systems and networking architectures share similarities relevant to the environment of the present invention.

Figure 2:
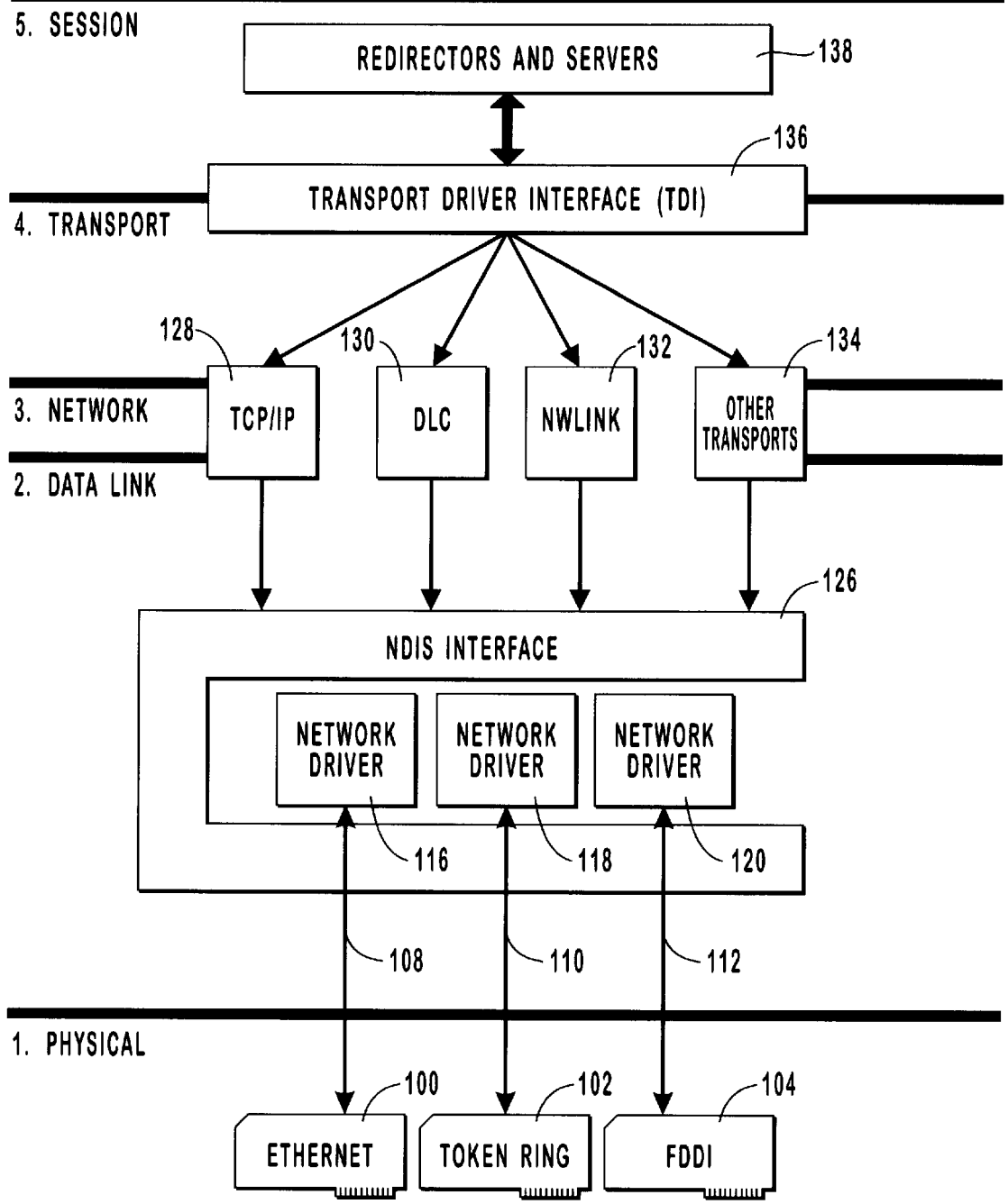
FIG. 2 is a diagram illustrating some of the functional components present in a layered network architecture.

In order to more fully understand the, context of the present invention, reference is next made to FIG. 2, which illustrates a simplified diagram of certain of the components that make up the Windows NT networking model. For purposes of illustration, the OSI layers that correspond to the various Windows NT components are also shown. At the bottom layer, corresponding to the physical layer in the OSI model, resides the actual NICs (sometimes referred to as network cards, or network adapters) 100–104. NICs are the hardware devices that provide the physical interconnection with the physical medium (the network cable), and the transmission of the signals that carry the data generated by all the higher level layers, in accordance with the particular network topology. As noted above, many NICs are equipped with a dedicated processor and memory, and are capable of performing additional sophisticated computing tasks—including tasks that may otherwise be handled by the host processor CPU. NICs can be physically implemented as a printed circuit board card that is positioned within a slot in the computer, as a PCMCIA type card that is placed within a PCMCIA-compliant slot, as a dedicated chip positioned within the computer chassis on the mother board, or in any other suitable matter.

Each NIC is logically interconnected with the Windows NT networking model, as is schematically represented by bidirectional lines 108–112, via a corresponding network driver 116–120. Network drivers reside in the MAC sublayer of the network model, and link Windows NT to the physical network channel via the corresponding NICs. Each driver, typically implemented as a software component provided by the vendor of the corresponding NIC, is responsible for sending and receiving packets over its corresponding network connection and for managing the NIC on behalf of the operating system. Each driver also starts I/O on the corresponding NIC and receives interrupts from them, and calls upward to protocol drivers to notify them of its completion of an outbound data transfer. Also, the device driver will be responsible for invoking, controlling and/or monitoring any of the additional processing capabilities of the corresponding NIC.

In some environments the driver component is written so as to implement a single specific network protocol, such as TCP/IP or XNS. The basic invention of the present invention described and claimed herein would be applicable to such an environment. For purposes of illustration however, the present invention is described in connection with the Windows NT network architecture, in which an interface and environment called the network driver interface specification (NDIS) is provided. The NDIS interface is functionally illustrated in FIG. 2 at 126. NDIS shields each of the network drivers 116–120 from the details of various transport protocols (examples of which are shown at 128–134), and vice versa. More particularly, NDIS describes the interface by which one or multiple NIC drivers (116–120) communicate with one or multiple underlying NICs (100–104), one or multiple overlying transport protocol drivers, or transports, (represented at 128–134 in FIG. 2), and the operating system.

Essentially, NDIS defines a fully abstracted environment for NIC driver development. Thus, for every external function that a NIC driver needs to perform, from registering and intercepting NIC hardware interrupts to communicating with transport protocol drivers to communicating with an underlying NIC via register manipulation and port I/O, it can rely on NDIS APIs to perform the function. To provide this level of abstraction and resulting portability, NDIS uses an export library referred to as the NDIS Interface Library Wrapper (not shown). All interactions between NIC driver and protocol driver, NIC driver and operating system, and NIC driver and NIC are executed via calls to wrapper functions. Thus, instead of writing a transport-specific driver for Windows NT, network vendors provide the NDIS interface as the uppermost layer of a single network driver. Doing so allows any protocol driver to direct its network requests to the network card by calling this interface. Thus, a user can communicate over a TCP/IP network and a DLC (or an NWLINK, or DECnet, VINES, NetBEUI and so forth) network using one network card and a single network driver.

At the network and data link layers are transport, protocol and related drivers, shown by way of example in FIG. 2 at 128–134. In Windows NT, a transport protocol driver is a software component that implements a transport driver interface (TDI), or possibly another application-specific interface at its upper edge, to provide services to users of the network. In Windows NT, the TDI provides a common interface for networking components that communicate at the Session Layer, such as the Redirector and Server functions illustrated at functional block 138. As is well known, transport protocols act as data organizers for the network, essentially defining how data should be presented to the next receiving layer and packaging the data accordingly. They allocate packets (sometimes referred to in the Windows NT context as NDIS packets), copy data from the sending application into the packet, and send the packets to the lower level device driver by calling NDIS, so that the data can be sent out onto the network via the corresponding NIC.

It will be appreciated that additional functions, or tasks, can also be performed on the data packet as it passes through the various network layers, typically at layers 3 and 4 of the network model. For instance, transport protocol drivers may calculate a checksum value and then append it to the packet. This helps to assure the integrity of the data as it traverses network links. Generally, this operation require the transport protocol corresponding with the sender of the network packet to append it with a number calculated by adding up the data elements composing the packet. The receiver of the packet then compares the appended checksum number to the data, thereby confirming that data was not changed in transit.

Another related task that could optimally be performed in the NIC hardware is the calculation of a message digest for the data packet. Like the checksum, a message digest is used to guarantee the integrity of the data in the packet. In addition, a message digest can be used to guarantee the authenticity of the data by assuring that the party who sent the message is who they purport to be. Calculation of a message digest is very CPU intensive, and is a function that is expensive to implement in software.

Another desirable function is the encryption of the data within the packet. Encryption refers to the cryptographic process of transforming the message in the packet so that it becomes impossible for an unauthorized reader of the packet to actually see the contents of the message without prior knowledge of the encryption key. Of course, cryptographic algorithms also tend to be very CPU and memory intensive, and can be prohibitively expensive if performed in software.

Another task that can be performed on the data packet is TCP segmentation. As is well known, TCP segments large data packets into segments that align with the maximum data size allowed by the underlying network. For instance, Ethernet allows a maximum of 1514 byte packets on the network. Thus, if TCP must send 64 Kbytes for example, it must parse the data into 1514 byte segments.

These and other functions are typically performed by the computer CPU 21 in software components residing at the various network layers, and thus can utilize substantial computer resources, resulting in an overall decrease in the computer system performance. Thus, offloading these, or other similar tasks so that they can instead be performed at the corresponding NIC hardware can greatly increases the overall speed and efficiency of the computer system.

Figure 3:
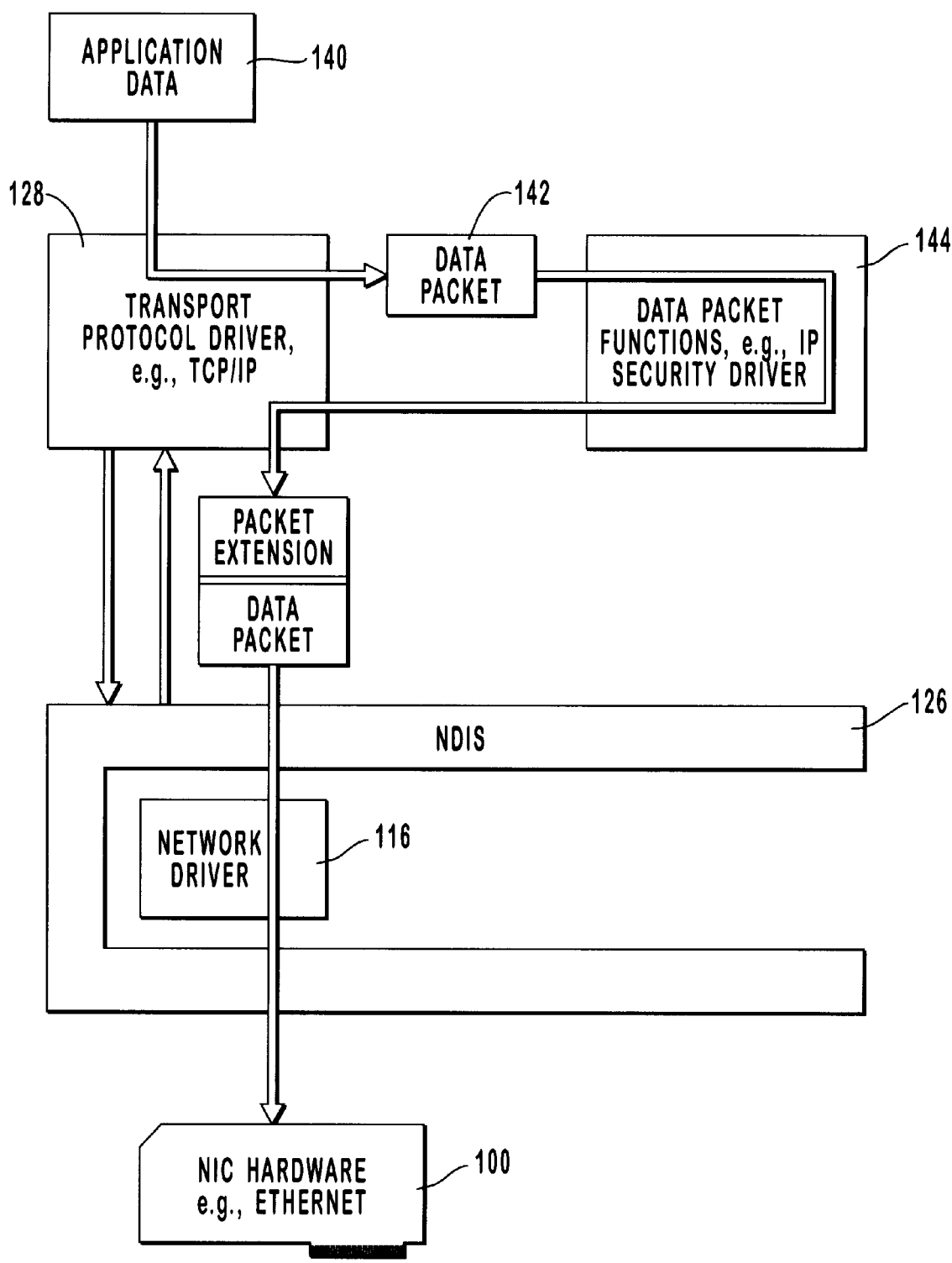
FIG. 3 is a functional block diagram illustrating the flow of a data packet through program components in accordance with one presently preferred embodiment of the invention.

As previously noted, the basic unit of data transmission in a Windows NT or similar layered networking model is the data packet. In the Windows NT environment, the data packet is referred to as the NDIS packet. Each packet travels from the top of the stack (i.e., layer 5 in the ISO stack) to the lowest software layer (i.e., layer 2 in the ISO stack). Thus, the packet defines a data structure that is common through each level as it proceeds through the layers during transmission and reception of data. By way of example, FIG. 3 illustrates the path followed by the packet as it proceeds down through the respective layers to the NIC, shown at 100 as an Ethernet NIC. As noted above, the transport driver 128 receives data from a sending application and packages it in packet form consistent with the underlying protocol, and then forwards the packet to the lower level device driver 116 via the NDIS interface 126. In addition, the transport protocol may perform other functions on the packet (e.g., checksum calculation, etc.). Alternatively, other functional components may reside in the network layer or data link layers that perform additional functions on the packet, such as the IP Security function 144 (e.g., encryption and/or message digest calculation) illustrated in FIG. 3.

In one preferred embodiment of the present invention, the data packet 142 is the means by which computing tasks are offloaded to the peripheral device, such as the NIC hardware 100. For instance, in FIG. 3 the application data 140 is passed down from the upper layers of the network model to an appropriate transport protocol driver, such as TCP/IP 128. The driver repackages the data into an appropriate data packet 142. Then, depending on whatever additional functions are to be performed on this particular data packet 142 a functional component is included that appends a predefined data structure, referred to as the packet extension, to the data packet. As will be discussed in further detail below, the contents of the packet extension indicate which task, or tasks, are to be performed on the data packet when it reaches the NIC 100. When the data packet 142 reaches the network driver 116, the contents of this packet extension are queried by the driver 116 so as to ascertain which task(s) is to be performed by the NIC 100. The driver 116 then controls/manipulates the hardware on the NIC so that it will perform whatever functional tasks have been requested via the contents of the patent extension.

For example, in FIG. 3, the data packet 142 is passed to a software component 144, which could be implemented separately or implemented as a part of the transport protocol driver itself, that appends a packet extension to the packet 142. Data will be included within in packet extension depending on the particular task that is to be offloaded. For instance, if an IP security function is to be implemented, data that indicates that the NIC 100 should encrypt the data packet in accordance with a specified encryption key would be included. Of course, the software component 144 could append predefined data such that any one of a number of functions, such as those discussed above, would be performed at the hardware level instead of by software components that reside in the network layers. The device driver 116 will extract the information from the packet extension, and then invoke the specified task(s) at the NIC 100.

Figure 4:
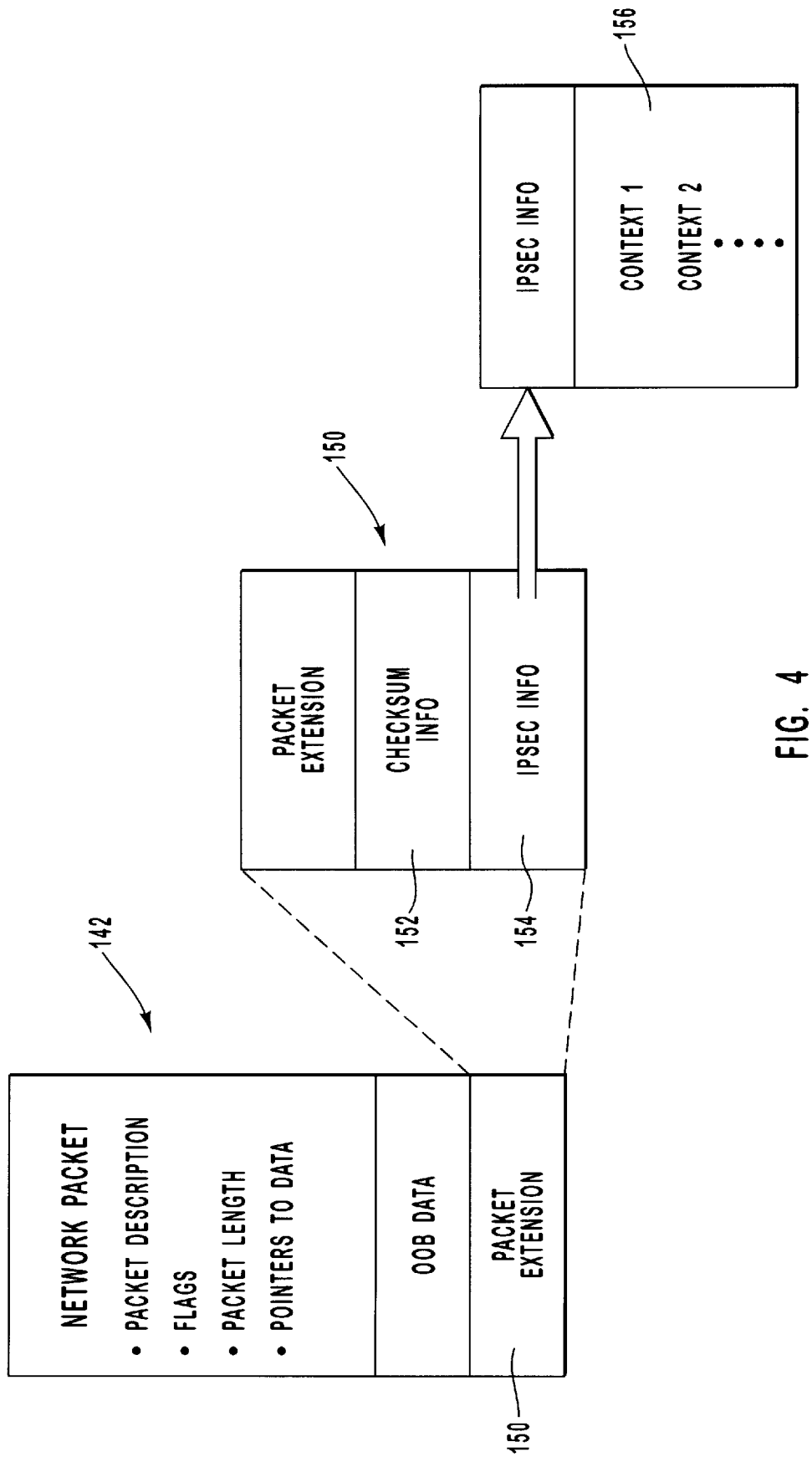
FIG. 4 is a diagram illustrating one presently preferred embodiment of the data packet and the packet extension.

FIG. 4 illustrates one presently preferred embodiment of the general structure of the data packet 142. While the packet 142 can be of any format depending on the exact network environment being used, in a Windows NT environment the packet is formatted according to NDIS, and includes information such as a packet descriptor; flags whose meaning is defined by a cooperating device driver(s) and protocol driver(s); areas for storage of Out-of-band data (OOB) associated with the packet; information relating to the length of the packet; and pointers to memory locations elating to the data content of the packet.

FIG. 4 further illustrates the additional data structure field that is appended to the NDIS data packet to identify task offloads—the packet extension 150. As discussed, it is this packet extension 150 which defines a data structure containing information necessary for the identification of the particular task, or task, that are being offloaded to the destination NIC. In the preferred embodiment, for each task offload type (e.g., checksum, encryption/decryption, etc) a predefined data, field will be included within the packet extension 150. This data field can simply be in the form of a control flag or flags, which merely indicates that a particular function be performed (such as a checksum), or the information can be in the form of a pointer to a data structure that further defines how a task should be carried out. For instance, in the example shown in FIG. 4, the packet extension 150 contains a flag signifying that the NIC perform a checksum operation, indicated at 152. For this type of task, the packet extension would also be set such that the NIC at the receiving station checks the validity of the checksum calculated by the sending NIC.

By way of example and not limitation, a preferred embodiment of the packet extension data structure for signifying that the NIC perform a checksum operation has the following structure:

```
typedef struct_NDIS_TCP_IP_CHECKSUM_PACKET_INFO
{
    union
    {
        struct
        {
            ULONG    NdisPacketChecksumV4:1;
            ULONG    NdisPacketChecksumV6:1;
        }
        Transmit;
        struct
        {
            ULONG    NdisPacketTcpChecksumFailed:1;
            ULONG    NdisPacketUdpChecksumFailed:1;
            ULONG    NdisPacketIpChecksumFailed:1;
            ULONG    NdisPacketTcpChecksumSucceeded:1;
            ULONG    NdisPacketUdpChecksumSucceeded:1;
            ULONG    NdisPacketIpChecksumSucceeded:1;
            ULONG    NdisPacketLoopback:1;
        }
        Receive;
        ULONG    Value;
    };
}
NDIS_TCP_IP_CHECKSUM_PACKET_INFO,
*PNDIS_TCP_IP_CHECKSUM_PACKET_INFO;
```

In this particular packet extension data structure, if the variables NdisPacketChecksumV4 and NdisPacketChecksumV6 both are not set then the device driver should send the data packet without doing any checksum on it.

FIG. 4 also illustrates how the packet extension 150 further specifies that a security function 154, such as would be performed in connection with an encryption of packet data and/or the calculation of a message digest, should also be performed by the sending NIC. For this type of task, field 154 preferably contains a pointer to a memory location containing a data structure, which in turn contains information relevant to the performance of the encryption and/or message digest functions. Under some circumstances, the inclusion of a pointer to a memory location having pertinent data has advantages over storing actual data within the packet extension itself.

Figure 5:
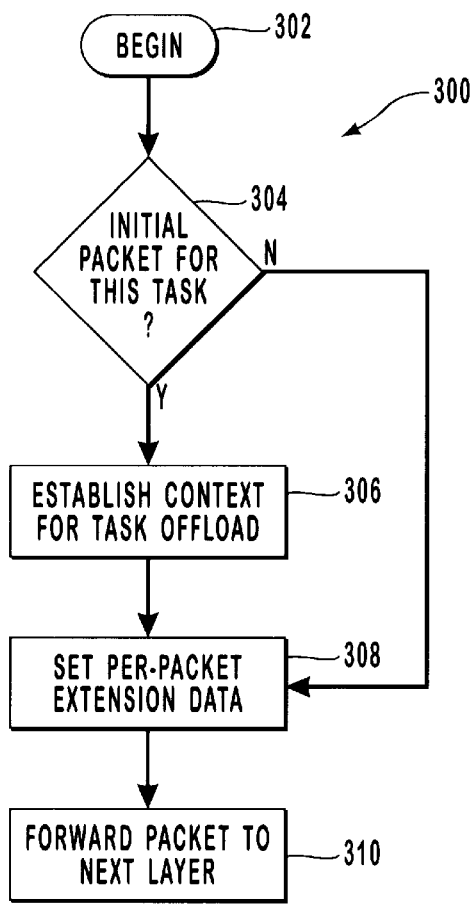
FIG. 5 is flow chart illustrating one presently preferred embodiment of the program steps used to offload tasks on per-packet basis.

One such advantage is illustrated in FIG. 5, which illustrates an example of a preferred program sequence that corresponds to the situation where multiple successive data packets may need to have the same type of encryption or digest calculation operation performed. After beginning at program step 302, program step 304 determines whether the current packet is the first packet in the sequence of packets. If so, then this first packet is provided with information, or context, that is to be used for that operation on the succeeding packets as well. For instance, the first packet will have a packet extension that sets forth the particular encryption key to use. This value, or context, will be stored in a separate memory location, or handle. Successive packets will not have to include this information, and would, for instance, only have provide a pointer to the memory location where the encryption key (or other context information) is stored, as is denoted at program step 308. This approach reduces the overall size of subsequent data packets in the sequence of packets, and further enhances the efficiency and portability of the ask offload method.

In a preferred embodiment, the information contained within the packet extension 150 is queried by the particular device driver to which the packet 142 is sent. In the Windows NT environment described in the illustrated embodiments, this type of function would preferably be performed by making appropriate NDIS function calls. For instance, a call to a predefined NDIS function that returns a pointer to the packet extension 150 memory location for the packet could be performed. The device driver software could then identify which tasks are to be performed and, depending on the task(s) offloaded, operate/manipulate the driver's corresponding NIC hardware in the appropriate manner.

Utilizing the actual data packet to offload computing tasks from the computer processor to the hardware peripheral is advantageous for a number of reasons. For example, the transport driver can utilize the capabilities of the peripheral on a packet-by-packet basis. This allows tasks to be downloaded dynamically, and the capabilities of a peripheral can be used on an as-needed basis. Thus, if the processing overhead for the computer system is low at a particular point in time, it may be desirable to perform certain tasks on the computer processor in a conventional fashion. Alternatively, if CPU is heavily loaded with other computing tasks, then it can offload tasks to peripheral devices by merely appending the requisite packet extension to the data packets.

Another advantage is the ability offload multiple tasks by way of a single packet, and essentially "batch" a number of operations it once. For instance, when the computer processor performs a checksum operation, or in encryption operation, the entire data field must be loaded into a memory location before the operation can be completed, i.e., the calculation of the checksum or the encryption of the packet data. Moreover, because of the layered networking model only one operation can be performed at a time, thereby requiring the data to be copied into memory multiple times. However, the per-packet approach allows multiple tasks to be offloaded in one packet. Thus, the hardware peripheral can perform two or more operations in a single pass on the data, depending on the capabilities of the hardware, and thereby greatly increase the throughput and efficiency of the computer system.

It will be appreciated that while the above scheme is particularly useful in connection with the ability to specify tasks to be offloaded to a particular NIC, the per-packet transfer of information could be used in other ways as well. For instance, if a particular NIC is capable of scheduling the delivery of packets at predetermined times, the packet extension data structure could be used to pass information identifying how and/or when the packet should be sent by the NIC hardware.

In a preferred embodiment of the present invention, before a transport protocol driver will append a packet extension to a data packet so as to offload a particular task to a NIC, two additional functions are initially performed. Insofar as there are many different types of hardware peripherals, each having varying processing capabilities, embodiments of the present invention preferably provide a means by which the transport driver can first query the task offload capabilities of the peripherals that are connected to the computer system. Once these capabilities have been ascertained, the transport protocol driver can then set, or enable, those tasks that are of interest. Once enabled, the specified tasks can be subsequently utilized on a per-packet basis in the manner described above.

Figure 6:
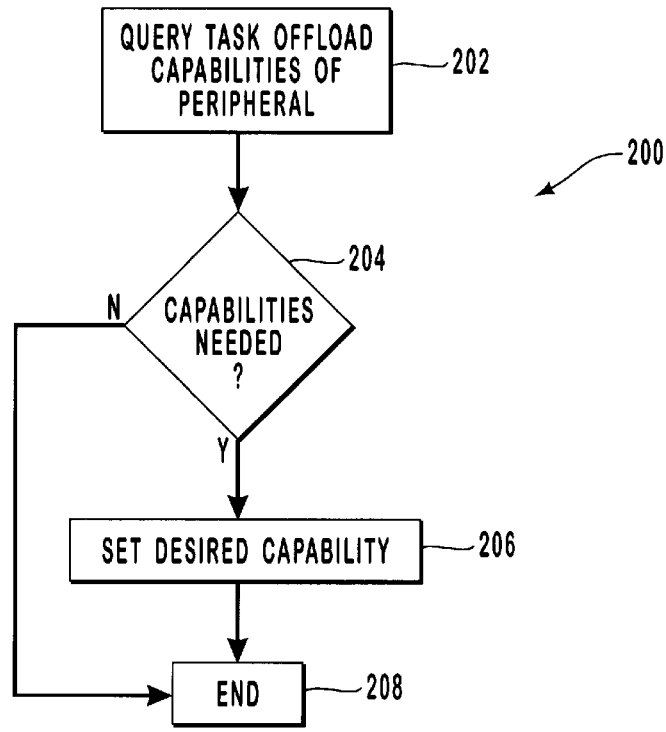
FIG. 6 is a flow chart illustrating one presently preferred embodiment of the program steps used to query and set the task offload capabilities of a peripheral device.

FIG. 6 illustrates one presently preferred set of program steps for implementing this ability to query the task offload capabilities of a peripheral, such as a NIC, and for then setting/enabling those tasks that may be needed. Preferably, the illustrated program steps are implemented as a software component or module that is integrated within a transport protocol driver. Moreover, if implemented in a Windows NT environment, many of the functional operations and inter-driver communications are preferably carried out via the NDIS interface. Of course, if implemented in a different operating system environment, or implemented in connection with non-network types of peripherals, then the illustrated program steps would have to be modified accordingly.

Beginning at program step 202, executable program instructions are performed by the computer system CPU (e.g. processing unit 21 in FIG. 1) that query the task offload capabilities of a peripheral(s) connected to the computer system. In the exemplary environment, the peripheral(s) would be the NIC(s) attached to the system. Preferably, each NIC device driver (116–120 in FIG. 2) will have associated with it a predefined task offload buffer location(s) that each contains the task offload capabilities for that device driver and its corresponding NIC. At a minimum, the task offload buffer will identify the particular task(s) supported by the NIC and its device driver, and will also include any information specific to each individual task supported. In the preferred embodiment, the contents of a device driver's task offload buffer are retrieved by way of an NDIS function call.

By way of example, and not limitation, a preferred embodiment of the driver's task offload buffer has the following structure:

```
typedef struct_NDIS_TASK_OFFLOAD
{
    ULONG       Size;
    NDIS_TASK   Task;
    ULONG       OffsetNextTask;
    ULONG       TasBufferLength;
    UCHAR       TaskBuffer[1];
}
NDIS_TASK_OFFLOAD,
*PNDIS_TASK_OFFLOAD;
``` wherein:
- Size — This variable is set to the size of this structure, and is used to determine the version of the structure in use.
- Task — This indicates the type of task offload defined in the structure.
- OffsetNextTask — Offset to the next task offload buffer. The value is 0 if this is the last task supported by this driver/NIC.
- TaskBufferLength — Length of the task offload buffer that follows this structure.
- TaskBuffer — This is a task specific buffer that contains information/data necessary for describing the particular task offload defined in this structure.

Once the particular task offload capabilities of each peripheral have been ascertained, processor 21 proceeds to the computer executable instructions corresponding to the function illustrated at program step 204 in FIG. 6. Here, it is determined whether any of the particular task offload capabilities supported by each peripheral NIC are of any interest to the transport. If no tasks are supported by the peripheral, or if the tasks that are supported are not useful to the transport, then the processor will proceed directly to program step 208, where this particular line of processing stops, and the transport proceeds in its normal fashion. Alternatively, if one or more of the tasks identified are of interest, then program step 206 is performed. At this step, executable instructions are performed that set those particular task offload capabilities the protocol driver wants enabled. This informs the device driver and its corresponding NIC what type of task offloading it may expect on a per packet basis. In a preferred embodiment, the task offload capability is set by setting appropriate data values in a data structure that is then passed to the corresponding device driver via an NDIS interface function call. For example, for a particular task, the appropriate bits in the task's task offload buffer structure can be set by the transport, thereby enabling the task for that driver/NIC. The transport can thus enable any number of task offload capabilities of each NIC/NIC driver that it may want to later use.

Once the desired offload capabilities have been enabled for each device driver and its corresponding NIC, the computer system processor 21 proceeds to program step 208, where processing for this particular function ends. At this point, the transport driver can utilize each of the task offload capabilities that have been enabled on a per packet basis in the manner previously described.

In summary, embodiments of the present invention provide distinct advantages over what is currently available in the prior art. Specific processing tasks that would otherwise be performed in a computer system's processor and memory, are instead downloaded to a particular peripheral device, or devices, that are connected to the computer. The computing task is then performed by the peripheral, thereby saving computer system resources for other computing tasks. Especially where the offloaded processing task is CPU and/or memory intensive, this task offload scheme can dramatically increase the overall computing efficiency of the computer system. Advantageously, the disclosed method for offloading computing tasks provides a means by which tasks can be offloaded on a dynamic, as-needed basis. As such, the processor is able to offload tasks instances where it is busy processing other computing tasks and processor overhead is high. Alternatively, when demand on the computer system's processing resources is lower, the processor may instead perform the task on its own. In addition, multiple tasks can be offloaded in batches to a particular peripheral. Oftentimes, a peripheral will be optimized so as to perform such multiple tasks in a much more efficient manner than the computer processsor—again resulting in improvements to the overall system's efficiency. Finally, a method of the present invention provides a processing scheme by which the particular task offload capabilities of a peripheral can be queried, and thereafter selectively enabled. In this way, the computer system can easily discern the capabilities of its various peripheral devices, and take advantage only of those processing capabilities that are, or may be, thereafter needed.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system environment having at least one software component and at least one peripheral hardware device, a method for dynamically offloading, on a per-packet basis and depending on the then current needs of the computer system, an operating task from the software component to the peripheral hardware device thereby freeing up host processor resources and increasing the overall efficiency of the computer system, the method comprising:

a step for querying the peripheral hardware device to determine the task offload capabilities of the peripheral hardware device;

a step for enabling selected task offload capabilities of the peripheral hardware device to the extent such selected task offload capabilities are needed for one or more packets;

in the event that an operating task to be performed for a packet by the software component corresponds to an enabled task offload capability on the peripheral hardware device, and depending on the then current needs of the computer system, performing the act of selectively offloading the operating task from the software component to the peripheral hardware device by sending a data packet to the peripheral hardware device indicating that the peripheral hardware device perform the specified operating task; and a step for performing at the peripheral hardware device the offloaded operating task.

2. A computer-readable medium having computer-executable instructions for performing the steps and act recited in claim 1.

3. A method as recited in claim 1, wherein the peripheral hardware device is a network interface card (NIC) that is operatively connected to the computer system.

4. A method as recited in claim 1, wherein the software component is a network software application executing in a layered network model.

5. A method as recited in claim 1, wherein the task offload capabilities of the peripheral hardware device are queried by reading task data stored in at least one task offload buffer associated with the peripheral hardware device, wherein the task data is indicative of the particular task offload capability of the peripheral hardware device.

6. A method as recited in claim 5, wherein the peripheral hardware device has multiple task offload buffers associated with it, thereby defining multiple task offload capabilities of the peripheral hardware device.

7. A method as defined in claim 1, wherein the selected task offload capabilities of the peripheral hardware device are enabled by setting at least one flag indicator in a task offload buffer associated with the peripheral hardware device.

8. A method as defined in claim 1, wherein the packet is a network data packet comprising network data and packet extension data, wherein the packet extension data is comprised of at least one data field indicative of at least one operating task to be performed by the peripheral hardware device.

9. A method as defined in claim 8, wherein the peripheral hardware device is a Network Interface Card (NIC).

10. A method as defined in claim 1, wherein the operating task is selected from one or more of the following operating tasks: a checksum operation; an encryption operation; a message digest calculation operation; a TCP segmentation operation; and a decryption operation.

11. A method as recited in claim 1, the software component comprising a transport protocol driver software component, the computer system including a network interface card (NIC) device driver, wherein the peripheral hardware device comprises a corresponding network interface card (NIC) connected to the computer system, wherein the step for guerying the peripheral hardware device to determine the task offload capabilities of the peripheral hardware device comprises the following:

an act of creating a data structure that includes task data that identifies the task offload capabilities of the NIC;

an act of querying the task data contained within the data structure to identify the task offload capabilities of the NIC;

wherein the act of selectively offloading the operating task comprises an act of appending task offload data to the packet; and wherein the step for performing the offloaded operating task comprises an act of performing the at least one offloaded task at the NIC in accordance with the appended task offload data.

12. A computer-readable medium having computer-executable instructions for performing the steps and acts recited in claim 11.

13. A method as defined in claim 11, wherein the data structure comprises:

a first data field containing data representing a type of task offload capability; and a second data field containing data necessary for performing the task offload defined in the first data field.

14. A method as defined in claim 11, wherein the NIC is selectively enabled to perform at least one of the identified task offload capabilities by writing at least one data field into the data structure.

15. A method as defined in claim 11, wherein the task offload data appended to the packet comprises a first data field representing the type of offloaded task to be performed by the NIC when the NIC receives the packet.

16. A method as defined in claim 15, wherein the task offload data further comprises a second data field containing at east one pointer to a memory location, the memory location containing data needed to perform the offloaded task specified in the first data field of the task offload data.

17. A computer-readable medium having computer-executable instructions for dynamically offloading, on a per-packet basis and depending on the then current needs of the computer system, a computing task to be executed at a network interface card (NIC) that is connected to a computer system thereby freeing up host processor resources and increasing the overall efficiency of the computer system, the computer-readable medium further including computer-executable instructions comprising:

a step for notifying applications executing on the computer system of any task offload processing capabilities of the NIC;

for every network data packet that is destined for the NIC from an application executing on the computer system, a step for reviewing a packet extension data structure appended to the data packet, the packet extension data structure containing information for identification of one or more particular operating tasks being offloaded to the NIC; and a step for causing the NIC to perform an operating task in accordance with data contained within the packet extension data structure appended to the network data packet.

18. A computer-readable medium as defined in claim 17, wherein the computer-executable instructions for performing the notifying step comprise the steps of creating a task offload buffer data structure comprising a first data field containing data representing a type of task offload capability for the NIC.

19. A computer-readable medium as defined in claim 18, wherein the task offload buffer data structure further comprises at least one additional data field containing data necessary for performing the task offload defined in the first data field.

20. A computer-readable medium as defined in claim 17, wherein the packet extension data structure appended to the network data packet comprises a first data field representing the type of operating task that is to be performed by the NIC.

21. A computer-readable medium as defined in claim 20, wherein the packet extension data structure further comprises at least one additional data field containing at least one pointer to a memory location, the memory location containing data needed to perform the operating task specified in the first data field of the packet extension data structure.

22. In a computer system environment having at least one software component and at least one peripheral hardware device, a method for dynamically offloading, on a per-packet basis and depending on the then current needs of the computer system, an operating task from the software component to the peripheral hardware device thereby freeing up host processor resources and increasing the overall efficiency of the computer system, the method comprising:

an act of reading task data stored in at least one task offload buffer associated with the peripheral hardware device, wherein the task data is indicative of the particular task offload capability of the peripheral hardware device an act of querying the task data contained within the at least one task offload buffer to identify the task offload capabilities of the peripheral hardware device;

an act of setting at least one flag indicator in a task offload buffer associated with the peripheral hardware device, wherein the flag indicator represents the enabling of an associated task offload capability needed for one or more packet;

in the event that an operating task to be performed for a packet by the software component corresponds to an enabled task offload capability on the peripheral hardware device, and depending on the then current needs of the computer system, performing the act of selectively offloading the operating task from the software component to the peripheral hardware device by appending task offload data to a data packet and sending the data packet to the peripheral hardware device; and an act of performing the at least one offloaded task at the peripheral hardware device in accordance with the appended task offload data.

23. A computer-readable medium having computer-executable instructions for performing the acts recited in claim 22.

24. A method as recited in claim 22, wherein the peripheral hardware device is a network interface card (NIC) that is operatively connected to the computer system.

25. A method as recited in claim 22, wherein the software component is a network software application executing in a layered network model.

26. A method as recited in claim 22, wherein the peripheral hardware device has multiple task offload buffers associated with it, thereby defining multiple task offload capabilities of the peripheral hardware device.

27. A method as defined in claim 22, wherein the peripheral hardware device is a Network Interface Card (NIC).

28. A method as defined in claim 22, wherein the operating task is selected from one or more of the following operating tasks: a checksum operation; an encryption operation; a message digest calculation operation; a TCP segmentation operation; and a decryption operation.

* * * * *

UNITED STATES PATENT AND TRADEMARK OFFICE
CERTIFICATE OF CORRECTION

PATENT NO. : 6,141,705
DATED : October 31, 2000
INVENTOR(S) : Sanjay Anand; Kyle Brandon; Nk Srinavas; Jameel Hyder It is certified that error appears in the above-identified patent and that said Letters Patent is hereby corrected as shown below:

Column 1,
Line 11, after "relates" change "general y"to -- generally --

Column 2,
Line 22, after "layer" change "believe" to -- believes --
Line 34, after "resulting" change "demand" to -- demands --

Column 4,
Line 18, after "embodiment" change "asks" to -- tasks --
Line 30, after "multiple" change "cpu" to -- CPU --

Column 5,
Line 39, after "intended" change "o" to -- to --

Column 6,
Line 2, after "bus" change "architecture" to -- architectures --
Line 29, after "memories" change "(ROM)" to -- (ROMs) --
Line 60, before "network" change "a ea" to -- area --

Column 7,
Line 65, after "understand" change "the," to -- the --

Column 9,
Line 33, after "operation" change "require" to -- requires --

Column 11,
Line 6, after "locations" change "elating" to -- relating --
Line 13, after "or" change "task" to -- tasks --

Column 12,
Line 19, after "have" and before "provide" insert -- to --
Line 52, after "operations" change "it" to -- at --

Column 14,
Line 13, after "ULONG" change "TasBufferLength" to -- TaskBufferLength --

Column 16,
Line 44, after "for" change "guerying" to -- querying --

Column 17,
Line 11, after "at" change "east" to -- least --

UNITED STATES PATENT AND TRADEMARK OFFICE
CERTIFICATE OF CORRECTION

PATENT NO. : 6,141,705
DATED : October 31, 2000
INVENTOR(S) : Sanjay Anand; Kyle Brandon; Nk Srinavas; Jameel Hyder It is certified that error appears in the above-identified patent and that said Letters Patent is hereby corrected as shown below:

Column 18,
Line 21, after "more" change "packet" to -- packets --

Signed and Sealed this

Thirteenth Day of November, 2001

Attest:

*Nicholas P. Godici*

NICHOLAS P. GODICI
*Attesting Officer*    *Acting Director of the United States Patent and Trademark Office*